United States Patent Office 3,333,951
Patented Aug. 1, 1967

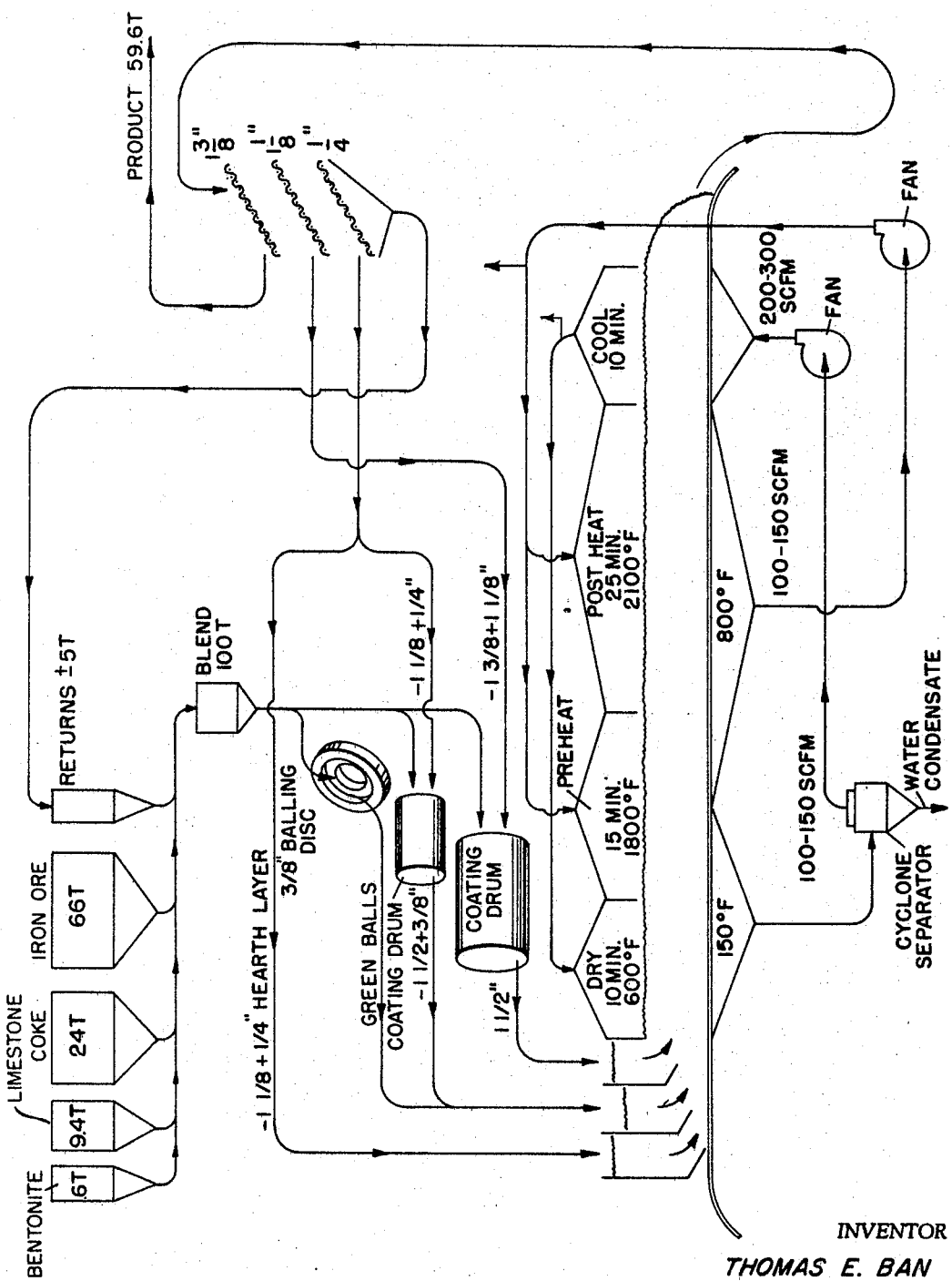

3,333,951
METALLIZED PELLETS
Thomas E. Ban, Cleveland Heights, Ohio, assignor to McDowell-Wellman Engineering Company, a corporation of Ohio
Filed June 14, 1965, Ser. No. 463,505
7 Claims. (Cl. 75—3)

ABSTRACT OF THE DISCLOSURE

This invention relates to a process for producing metallized layered iron ore pellets in which a major amount of the available iron in the ore is reduced to the metallic state and including the steps of blending with the iron ore a solid carbonaceous material and moisture, forming pellets of the moist blend, indurating the pellets, coating the indurated pellets with moistened ore blend, and reindurating the pellets.

---

The consideration of partially metallized hardened, or indurated, pellets in metallurgical processes for recovery of metal values by reduction of an ore to a metal has been increasing. Beneficiation of ores by blending therewith reducing agents, such as a solid carbonaceous material together with a fluxing agent is known. Metallization of pellets having such composition is usually accomplished by heating "green" or moist balls composed of water, flux, reducing agent, and metal-containing ore with hot gases under reducing conditions to convert a substantial portion of the metal from the naturally occurring oxide to the free metal within the body of the pellet to form a hard, indurated discrete pellet including flux material. Such metallized pellets are then used in substantial proportion along with raw ore and other ingredients in metal recovery apparatus.

A principal difficulty with previous metallized pellets has been that in order to obtain a substantial degree of metallization, for example 60% to 95% of the available metal within the pellet, the maximum size of pellets heretofore conveniently produced has been on the order of less than ½" in average diameter. Without considerable modification of the process by which the metallized pellets have heretofore been produced, attempts to produce metallized pellets of average particle size in excess of about ½" have been largely unsuccessful because the central part of the pellet very quickly becomes shielded from the effects of heat and reducing atmosphere by the formation of an insulating mantle of metal and fused flux around an unreacted core. Also, the large sized specimens require long periods of retention for adequate heat transfer. Therefore, the use of highly metallized pellets in metallurgical processes has been limited to pellets having average diameters in the range of from about ⅛" to about ⅜".

In the recovery of iron from metallized iron ore pellets, pellets of this size cannot be used without difficulty in a blast furnace fed, as it is, from the upper extremity. The temperatures encountered in a blast furnace adjacent the mouth of the furnace have been found sufficient to cause fusion of the flux-metal ingredients of the pellets at the points of contact between pellets within a mass of the pellets to a degree sufficient to form a rigid non-flowable mass which clogs and blocks the mouth of the furnace. Thus, in order to reduce the number of points of contact where such fusion apparently occurs, and thereby improve the mobility of the metallized pellets through the mouth of the blast furnace, the effort has been to increase the size of the pellets from a previous maximum of about ½" average diameter up to from 1" to 2" in average diameter. As indicated above, ordinary sintering techniques for producing metallized pellets are not satisfactory because of the formation of the protective mantle and the resultant relatively low degree of average metallization in the pellets.

It has now been found that relatively large diameter highly metallized pellets, that is, those pellets having average diameters in the range of from 1" to about 2" can be produced wherein the average degree of metallization is in the range of from about 60% to about 95% of the available metal values in the pellet, which pellets when utilized in a blast furnace, for example, show markedly reduced tendency to fuse together in such a manner as to block or clog the mouth of a blast furnace.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

In the annexed drawing there is shown diagrammatically a process for producing relatively large average diameter highly metallized pellets in accordance with the present invention.

For purposes of convenience, this invention will be described in relation to the production of highly metallized iron ore pellets, it being understood that the general principles of this invention are applicable as well to other metallized ore pellets useful in smelting processes, for example, the recovery of copper from copper ore, the recovery of zinc from zinc ore, etc.

Briefly stated, this invention is in a process for producing metallized layered ore pellets having a predetermined large diameter, i.e. in the range of from about 1" to about 2" in average diameter, and in which from about 60% to about 95% of the available metal values in said ore is reduced to the free metal. This process contemplates forming a dry blend of the metal ore including a solid reducing agent, such as a carbonaceous material. Frequently additional ingredients useful in the smelting process, such as a fluxing agent, e.g. limestone or a binding agent, e.g. bentonite clay is included in the blend. The dry blend of powdered materials, or granular materials, as is more often the case, is then moistened with water, and the resultant mass pelletized to form "green" or moist balls following conventional balling techniques to produce "green" balls having a predetermined average small diameter substantially less than the desired ultimate diameter of up to 2". The "green" balls are then indurated, preferably by passing hot gases through a layer of the moist pellets under conditions sufficient to form discrete metallized pellets in which from about 60% to about 95% of the available metal in the pellets is reduced to the free metal. The small indurated metallized pellets or seed pellets are then coated with an outer layer of the ore blend used in forming the "green" seed pellets in the first place. This coating step increases the diameter of the pellets, and the indurated pellets having a coating of moist ore blend then reindurated under the conditions of the initial indurating step to produce discrete metallized layered pellets in which from about 60% to about 95% of the available metal in the layered pellets is reduced to the metallic state, and one layer is virtually welded to the core and to any successive layers.

The reindurated pellets are then classified and separated into a portion having a relatively larger predetermined diameter, which may be the desired ultimate diameter, and a portion which has a relatively smaller diameter, the latter portion being recycled to the coating process and again subjected to induration to build up the particle size and yield a layered metallized pellet suitable for use in smelting apparatus.

This process is most conveniently carried out on the traveling grate machine, such as a Dwight-Lloyd traveling grate machine manufactured by the McDowell-Wellman Engineering Company. Such machines are widely employed in the metallurgical art and the principles of their operation are well understood. In general, such machines comprise a grate made up of the plurality of individual pallets or grates. The traveling grate is power driven and when operated in a pellet indurating device, passes continuously through an enclosed chamber or series of chambers which are equipped with gas confining hoods generally located above the grate, and gas exhausting means, such as one or more sealed windboxes coacting with fan means to ensure the flow of gas through the enclosed chamber or chambers. Means, such as a plurality of gas burners, are conveniently provided for supplying heat for the burden on the grate as it passes through the initial chambers. The traveling grate machine may also include heat conservation means for recovering heat from the exhaust gases, for example, to preheat incoming gases to be passed through the firing zones and the preheating zones. In operation, the charge to the traveling grate machine is distributed evenly on the grates, and in the present instance is desirably distributed on the grates in the form of layers of pellets of increasing size toward the top of the burden, the smaller pellets being located adjacent the grates. The depth of the layers may range from about 2" to about 10", and preferably are each about 4" to 8" in depth. The indurated pellet material emerging from the machine will fall from the pallets as discrete pellets as the pallets begin their return trip to the entrance of the machine.

In the traveling grate machine the "green" pellets are first slowly dried by gradually raising their temperature to within the range of from about 300° F. to about 800° F. in a period of time not less than about 2 minutes and up to 15 minutes in length, most usually about 10 minutes. If the temperature is raised too rapidly, the water vapor within the pellets will evolve so violently as to cause the disintegration of the pellets. The next step or zone in the heating cycle, results in an increase in bed temperature to from about 1000° to about 2200° F. Once again, the temperature must not be raised too rapidly because the evolution of carbon dioxide during this phase of the process will have the same effect as rapidly expanding water vapor, and at least about 2 minutes to about 20 minutes should be allowed for this stage of the treatment. As the final stage in the heating cycle, the bed temperature is raised to above about 2100° F., but not higher than the point of incipient fusion of the pellets, that is soft, but not molten. This period of time ranges from about 15 minutes to about 30 minutes. It is usually unnecessary to go much above about 2400° F., and this temperature need only be maintained during a soaking period of 5 to 10 minutes. Soaking may be found desirable to complete the chemical reaction within the bed, and thereafter the bed and the pallets are allowed to cool by circulating through the bed and pallets the neutral cooling gases from the drying stage, or by drawing inert gases through the bed in either upward or downward direction. The metallized pellets which are the product of this invention are the result of transformation of a simple form of iron oxide, a solid carbonaceous fuel such as coke, coke breeze, pulverized coal, or the like, with or without limestone. To improve the balling characteristics of the blend, it is desirable to add a relatively small amount, e.g. .3 to 2% by weight of the blend of a clay, such as bentonite. Returns from the screening operation at the end of the process may be recycled back to the process to conserve material, if desired.

Having reference to the flow sheet, it is observed that the desirable relatively larger sized pellets are formed by:

(a) Continuously recoating recycled undersized pellets with raw moist iron ore blend in making the burden for the traveling grate machine;

(b) Continuously forming seeds as a part of the burden for the traveling grate machine;

(c) Continuously locating the larger sized pellets at the top surface of the bed or burden; and (d) Continuously screening off the top sized pellet product.

The flow sheet illustrates a blend prepared from the ground powdered raw material which is 100 mesh or finer in structure. The raw materials consist of bentonite as a binding agent, limestone as a flux, coke as a reducing agent, and iron ore as the green feed stock material. As indicated, returns are illustrated in the circuit as a means for reclaiming undesirable indurated material, for example, undersized or fine particles.

An initmate blend of the raw materials illustrated in the amounts indicated on the feed bins of the flow sheet moistened and rationed to three operations as follows:

(a) A small balling disc which utilizes approximately 1% of the moistened blend material to form seed particles of pellets having an average diameter in the range of from $\frac{1}{8}$" to less than about $\frac{1}{2}$";

(b) A coating drum for recoating and recycling intermediate size materials which enter the drum at a size of $-1\frac{1}{8}$", plus $\frac{1}{4}$" and acquire approximately $\frac{1}{8}$" of coating in the outside surface; and (c) A coating drum for the larger sized pellets which enter the drum at $-1\frac{3}{8}$", plus $1\frac{1}{8}$" and apply a $\frac{1}{8}$" coating of moist raw blend thereon.

The hearth layer of recycled $-1\frac{1}{8}$", plus $\frac{1}{4}$" metallized indurated pellets is conveniently directly applied on the grates in a layer from 2" to 8" deep, preferably 3" to 4" deep. The hearth layer is not an essential element of the process, but is recommended for best results for recouperation of heat and as a protection for the grates. Green moist balls as seeds, and coated moderate size pellets are conveniently applied as a second layer which is approximately 3" to 10" deep and preferably from about 4" to 6" deep. The recycled full sized freshly coated pellets of approximately 1.5" or more in diameter are applied as the top layer on the burden to a depth of from 2" to 5", preferably about 3" deep.

The three layers or strata of charge comprising the burden on the traveling grate enter a first zone where they initially become dried in a period of about 10 minutes at a temperature of about 600° F. Preheated gases from the cooling zone at the conclusion of the traveling grate operation are conveniently utilized for the drying operation. The burden then enters a preheating zone which takes a period of about 15 minutes to traverse where it acquires a temperature of approximately 1800° F. as an average burden temperature in the top stratum. The burden then enters a post heating zone where the residence time is approximately 25 minutes and the temperature of the top layer reaches approximately 2100° F. to 2400° F. Thereafter, the burden passes through a cooling zone where cooled gases exiting from the drying zone are forced through the burden in an upward direction for the purpose of cooling the burden and preheating the gases to effect economy by reclaiming the heat within the burden.

Gases exiting from the preheat and post-heat zones are recirculated, and they may have additional heat values added thereto by introduction of combustible gas in the ducts leading to the preheat and post-heat hoods. Also appropriate quantities of gases are vented in order to compensate for gases formed by the physical and chemical reactions within the system. Usually, however, the exothermic nature of the reducing reaction and the oxidation of the fuel is sufficient to supply the heat required for conducting the thermal reactions resulting in the production of metallic iron within the pellets. Gas or oil may be used for maintaining the temperatures in the hooded areas. The recycled draught is controlled in composition so as to be neutral, or preferably slightly reducing. However, portions of the hood may be open to the atmosphere through the use of duct pipes which will enable air to be admitted to the bed to cause very high temperatures to exist if necessary. Ordinarily, the bed can be maintained at approximately 2300° F. without extensive fusion of the mass. The resulting particles are discrete.

The orientation of the material in the preferred three strata is important for purposes of producing the improved products of the present invention. The largest size particle at the top of the bed is exposed to the most severe temperature conditions. Those larger size pellets are able to endure severe temperatures without coalescing, melting and clinkering. Also the largest pellets require the highest temperature for acquiring more rapid heat transfer due to their lower specific surfaces per unit of weight. The draught immediately beneath the top layer is of lower temperature and consequently will not cause extensive clinkering and melting of the smaller size recoated pellets and seeds. A hearth layer containing the broader range of small sizes of recycled pellets serves for protection of the grate members and also benefits from the lower temperatures because further reduction and metallization occurs even at relatively low temperatures. Ordinarily bed temperatures will have a gradient in the first layer of approximately 2300° F. to 2000° F.; in the middle layer of from about 2000° F. to 1700° F.; and in the hearth layer of approximately 1700° F. to 1800° F.

As shown in the annexed exemplary flow sheet, the product is dumped from the traveling grate machine and screened in three stages to make the three types of product for recirculation along with the top size of finished product. However it will be observed that the process may have more or less stages of screening and recirculation, i.e. two stages can be applied by using minus 1, plus ¾″ green balls with a single stage of recoating to minus 2″, plus 1″ coated ball charge. The finished product is removed from the process and stored for use in a blast furnace. The resultant large size particles having an average diameter of from 1⅜″ to 2″ may be used in a blast furnace without encountering the problems of clogging or blocking the mouth of the furnace.

As indicated above, the several ingredients are ground and blended to produce a granular mix, the particle sizes of the respective ingredients being that which is suitable for balling, and generally in the range of from about 10 mesh to −325 mesh, preferably in the range of −100 mesh (Tyler). The materials are prepared so that the blend is substantially all −10 mesh and contains approximately 80% of −100 mesh material with approximately 50% being −325 mesh. Individual size analyses of raw materials are not critical, and it is the physical composition of the blend which enables proper balling characteristics.

The iron ore utilized in accordance with this process may be any of the commercially available ore materials. The present process is particularly suited for the beneficiated Taconite ore, and is especially useful in conjunction with the prepared low grade iron ores. To prepare the iron ore for this process it is pulverized to a fineness to within the range of about 100 mesh to about 200 mesh as practical limits. Finer sub-division of the iron ore may be, of course, be practiced but at the sacrifice of economics of the process.

The fluxing material is principally limestone. Other fluxing materials conventionally employed in iron making processes may also be included with the fluxing material as will be understood by those skilled in the art. For illustrative purposes, however, the present invention will concern those blends with limestone as the fluxing material, it being understood that other materials may be substituted therefor or admixed therewith. The fluxing material is likewise pulverized to within the same particle size range as the other materials.

The solid carbonaceous material useful in accordance with this invention is desirably a naturally occurring carbonaceous material. However, any carbonaceous fuel such as coke, coke breeze, anthracite coal, bituminous coal, lignite, or the like may be used. A solid carbonaceous material is desirably pulverized to the same fineness as the iron ore although it may be considerably coarser, for example, 65 mesh.

In general, the relative amount of carbon employed in those compositions is determined by the amount of reduction and hardening which is necessary to be carried out by the carbonaceous material. The carbonaceous material should contain free carbon and supply available carbon in an amount at least sufficient to convert all the iron oxide to metallic iron and provide the desired carbon content in the final pig iron, for example, 3.5% carbon. A practical mode of computing the amount of carbonaceous material assumes that the available carbon reacts with the iron oxide to yield carbon monoxide instead of $CO_2$ or a mixture of $CO_2$ and CO. It is further assumed that only the fixed carbon content of the carbonaceous material undergoes reaction or is available therefor. A certain amount of the fixed carbon content is lost and assumed to be about 20%. Thus when the available carbon in the carbonaceous material is calculated and this stoichiometrically calculated against the iron ore for reduction to elemental iron, the amount so calculated is multiplied by 1.2 to account for losses of fixed carbon. The result divided by the percentage of fixed carbon in the carbonaceous material yields the amount of such material to be employed in the given formulation. Common materials contain about 55% fixed carbon ordinarily, from 25% to 50% by weight of the entire mixture of carbonaceous material is sufficient for this purpose, and most usually about 30% by weight of the blend.

Better metal bonding is secured in the final discrete metallized pellets if the carbonaceous material has a relatively coarse particle size, that is, 6 to 65 mesh. It has been found that with more finely divided carbonaceous materials there is some tendency to form a protective coating of carbon around the metal and thus inhibit metal bonding.

The amount of fluxing material again is dependent in large measure on the extent of impurities which should by scavenged by the slag. Ordinarily, from 5% to 15% by weight of the composition is the fluxing material. The balance of the composition is the iron ore. It will, of course, be understood that the iron ore may contain as it naturally occurs certain proportions of limestone and other fluxing materials for which allowance is made in the preparation of the pulverized mixture.

A typical pig iron produced in accordance with the process of this invention analyses 3.5% carbon; 1.0% silicon; and 95.5% iron.

As indicated in the annexed flow sheet, the several pulverized ingredients are carefully blended to produce a uniform physical mixture. A typical composition of a dry basis of the blend is as follows:

| | Percent |
|---|---|
| Iron ore | 66 |
| Powdered coke | 24 |
| Limestone | 9.4 |
| Bentonite clay | .6 |

Following the blending step, the mixture is submitted to a balling operation, such operation being well known and conventionally practiced utilizing conventional balling or pelletizing machines. As those skilled in the art are well aware, there may be used for the purpose of pelletizing drums or inclined rotating pans; for the purposes of this invention the inclined pelletizing pan is preferred. Moisture is added to the composition as it enters the pan, and by controlling the rate of rotation of the pan, the moisture content, and the angle of inclination of the pan, the particle size of the pellets can be easily controlled and rendered remarkably uniform. Firm discrete green pellets are formed at a moisture content of from about 10% to about 15% water. The particle size is, as indicated, quite uniform, and for the purposes of this invention ranges from about 1/8" average diameter to about 3/8" average diameter.

The terms "green balls" or "green pellets" as used herein refer to the fact that the pellets or balls have not been dried or indurated, and identifies their moist condition upon leaving the balling apparatus.

The green pellets are discharged from the balling apparatus and conveyed to a conventional traveling grate machine, preferably in superimposed stratified relation to a hearth layer of recycled small particle size (−1⅛" to +¼") previously indurated pellets. As schematically shown in the flow sheet, the stratified burden enters a drying zone where substantially inert gases, preferably slightly reducing, at a temperature in the range of from about 300° F. to 600° F. are passed downwardly through the burden. A fan coacting with the wind box directly below the drying zone hood exhausts the moisture laden gases and pulls them through a cyclone separator where moisture is removed. The moisture depleted gases are pumped through the terminal portion of the bed to cool the burden and to preheat the gases for recycling to the drying zone.

The burden then passes into a preheating zone where the incoming gases have a temperature in the range of from about 1000° F. to about 2000° F., and preferably about 1800° F. A separate fan coacting with the windbox adjacent thet preheat and post-heating zones collects the gases from these zones and recirculates them for passage through both of these zones in a circulatory manner. Instead of discharging these gases to the atmosphere, these gases contain a substantial proportion of hydrocarbons and carbon monoxide which may be utilized to impart heat to the gases prior to recycling them through the burden. After burner means may be included in the gas stream to increase the temperature of the gases to a desired level and also to rid the gas stream of tars which otherwise tend to accumulate in the fans necessitating costly shut-downs to clean out this apparatus.

Finally the pellets enter a heat soaking or post-heating zone where the incoming gases have a temperature in the range of from about 2000° F. ot about 2400° F. The fan means coacting with the windbox adjacent the preheating and post-heating zones serves to propel the gases downwardly through the burden in the post-heating zone.

Finally in the preferred illustrative embodiment illustrated in the annexed drawing, the burden is submitted to an updraught of cool gases at the rate of from 50 to 300 standard cubic feet per minute( s.c.f.m.) per square foot of bed area. The residence time in the cooling zone may be about 5 minutes or longer, e.g. 10 minutes, if desired. The pellet discharge from the machine is then classified by screening. The particles having an average diameter greater than 1⅜" is the final desired relatively large diameter product of this process. These pellets may be further cooled and stock piled for subsequent shipment to steel making centers. Alternatively, the metallized relatively large diameter pellets may be water quenched, stock piled and subsequently shipped to steel making centers. Still further, the hot highly metallized pellets may be charged directly into a smelting or melting furnace, such as an electric arc furnace without cooling. These pellets contain up to 2% free carbon, and the bond holding the pellet together is largely metallic iron with or without some ceramic bond resulting from fusion of metallic oxides in the pellet.

The material which passes through the 1⅜" screen and is retained on the 1⅛" screen is returned to one of the coating drums where its diameter is increased by the application of an outer layer of moist raw iron ore blend to an average diameter of about 1½". A stratum of these coated pellets is introduced into the traveling grate machine as the top layer.

The material which passes through the 1⅛" screen and is retained on the 1¼" is random size particles within this size range. This portion is divided into two parts, one part by-passing the coating drum and passing directly to the traveling grate machine where it is introduced into a first hopper for deposition as a hearth layer. The other portion of the indurated pellets at random size enters an intermediate coating drum to yield particles which are generally smaller than 1½" and larger than ⅜" in average diameter by application of a coating of the same raw moist iron ore blend. The coated particles from this portion are fed to an intermediate hopper which superimposes on the hearth layer a stratum of coated balls along with green balls from the ⅜" balling disc.

The pallets on the traveling grate machines useful in the present invention may have a width of from 18" to 144" and are moved along the traveling grate machine bed at varying rates in order to accommodate retention periods for the given metalliferous ores being treated. A typical retention time for the entire process for a taconite ore composition such as given above would be approximately 60 minutes. The rate of flow of the gases through the bed in the heating and preheating zones is not critical, and for the purposes of the present invention, the rate of flow of the gases should desirably be controlled to be within the range of from 50 to about 200 standard cubic feet per minute per square foot of grate area. In the drying and cooling zones the rate of flow of the gases may be the same or considerably higher, e.g. in the range of from 200 to 300 standard cubic feet per minute per square foot of grate area.

There has thus been provided an improved process for forming highly metallized pellets of relatively large diameter, i.e. between 1" and 2" in average diameter, which pellets are multilayered in that they have been indurated, recoated, reindurated, and possibly recoated and reindurated a third time before finally achieving the desired large diameter particle size. In these multilayered metallized pellets, from about 60% to about 95% of the available metal has been reduced to the metallic state by the process herein described. These particles are hard, discrete particles which are easily handled and which flow easily from a suitable hopper into the mouth of a blast furnace, for example. Where limestone is included in the formulation, the pellets are self-fluxing and may be made to include a sufficient proportion of fluxing material to take care of the impurities in the coke for which such fluxing materials are normally included. Difficulty heretofore experienced with smaller sized metallized pellets due to the larger proportion of contact points, and fusion of the pellets at these points is not experienced with the large diameter pellets, one reason being that the larger diameter pellets have a lesser surface per unit weight than the smaller pellets and thus local temperatures do not exceed the fusion temperature of the contacting pellets to permit bonding and non-flowable aggregation to occur.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A process for producing metallized layered iron ore pellets having a predetermined large diameter and in which from about 60% to about 95% of the available iron in said ore is reduced to the metal, comprising the steps of:
  (a) forming a blend of iron ore including a solid carbonaceous material in an amount at least sufficient to reduce the iron content to free metal;
  (b) moistening said blend;
  (c) forming moist pellets of said moistened and blended iron ore having a predetermined average small diameter;
  (d) indurating said moist pellets to form discrete metallized pellets in which from about 60% to about 95% of the available iron in said pellets is reduced to the metal;
  (e) coating at least a portion of said indurated pellets with moistened iron ore blend to increase the average diameter of said pellets to a predetermined diameter larger than said predetermined small diameter;
  (f) reindurating said moist blend coated indurated pellets to form discrete metallized layered pellets in which from about 60% to about 95% of the available iron in said layered pellets is reduced to the metal;
  (g) separating from the reindurated pellets a portion having said larger predetermined diameter; and
  (h) recycling the relatively smaller pellets having an average diameter less than said predetermined larger diameter to said coating operation.

2. A process for producing metallized layered iron ore pellets having a predetermined large diameter and in which from about 60% to about 95% of the available iron in said ore is reduced to the metal, comprising the steps of:
  (a) forming a blend of iron ore including a solid carbonaceous material in an amount at least sufficient to reduce the iron content to free metal;
  (b) moistening said blend;
  (c) forming moist pellets of said moistened and blended iron ore having a predetermined average small diameter;
  (d) supporting a stratum of said moist pellets on a grate;
  (e) indurating said moist pellets by passing hot gases through said stratum to form discrete metallized pellets in which from about 60% to about 95% of the available iron in said pellets is reduced to the metal;
  (f) coating at least a portion of said indurated pellets with moistened iron ore blend to increase the average diameter of said pellets to a predetermined diameter larger than said predetermined small diameter;
  (g) supporting a stratum of said moist blend coated indurated pellets on said grate;
  (h) reindurating said moist blend coated indurated pellets by passing hot gases through said stratum to form discrete metallized layered pellets in which from about 60% to about 95% of the available iron in said layered pellets is reduced to the metal;
  (i) separating from the reindurated pellets a portion having said larger predetermined diameter; and
  (j) recycling the relatively smaller pellets having an average diameter less than said predetermined larger diameter to said coating operation.

3. A process for producing metallized layered iron ore pellets having a predetermined large diameter and in which from about 60% to about 95% of the available iron in said ore is reduced to the metal, comprising the steps of:
  (a) forming a blend of iron ore including a solid carbonaceous material in an amount at least sufficient to reduce the iron content to free metal;
  (b) moistening said blend;
  (c) forming moist pellets of said moistened and blended iron ore having a predetermined average small diameter;
  (d) supporting a stratum of said moist pellets on a grate;
  (e) indurating said moist pellets by passing hot gases through said stratum to form discrete metallized pellets in which from about 60% to about 95% of the available iron in said pellets is reduced to the metal;
  (f) moving said grate and progressively increasing the temperature of the hot gases passing through said stratum;
  (g) coating at least a portion of said indurated pellets with moistened iron ore blend to increase the average diameter of said pellets to a predetermined diameter larger than said predetermined small diameter;
  (h) supporting a stratum of said moist blend coated indurated pellets on said grate;
  (i) reindurating said moist blend coated indurated pellets by passing hot gases through said stratum to form discrete metallized layered pellets in which from about 60% to about 95% of the available iron in said layered pellets is reduced to the metal;
  (j) separating from the reindurated pellets a portion having said larger predetermined diameter; and
  (k) recycling the relatively smaller pellets having an average diameter less than said predetermined larger diameter to said coating operation.

4. A process for producing metallized layered iron ore pellets having a predetermined large diameter and in which from about 60% to about 95% of the available iron in said ore is reduced to the metal, comprising the steps of:
  (a) forming a blend of iron ore including a solid carbonaceous material in an amount at least sufficient to reduce the iron content to free metal;
  (b) moistening said blend;
  (c) forming moist pellets of said moistened and blended iron ore having a predetermined average small diameter;
  (d) supporting a stratum of said moist pellets on a grate;
  (e) indurating said moist pellets by passing hot gases through said stratum to form discrete metallized pellets in which from about 60% to about 95% of the available iron in said pellets is reduced to the metal;
  (f) moving said grate and progressively increasing the temperature of the hot gases passing through said stratum;
  (g) cooling said stratum at the conclusion of said indurating step;
  (h) coating at least a portion of said indurated pellets with moistened iron ore blend to increase the average diameter of said pellets to a predetermined diameter larger than said predetermined small diameter;
  (i) supporting a stratum of said moist blend coated indurated pellets on said grate;
  (j) reindurating said moist blend coated indurated pellets by passing hot gasses through said stratum to form discrete metallized layered pellets in which from about 60% to about 95% of the available iron in said layered pellets is reduced to the metal;
  (k) separating from the reindurated pellets a portion having said larger predetermined diameter; and
  (l) recycling the relatively smaller pellets having an average diameter less than said predetermined larger diameter to said coating operation.

5. A process for producing metallized layered iron ore pellets having a predetermined large diameter and in which from about 60% to about 95% of the available iron in said ore is reduced to the metal, comprising the steps of:
  (a) forming a blend of iron ore including a solid carbonaceous material in an amount at least sufficient to reduce the iron content to free metal;
  (b) moistening said blend;

(c) forming moist pellets of said moistened and blended iron ore having a predetermined average small diameter;

(d) supporting a stratum of said moist pellets on a grate;

(e) indurating said moist pellets by passing hot gases through said stratum to form discrete metallized pellets in which from about 60% to about 95% of the available iron in said pellets is reduced to the metal;

(f) moving said grate and progressively increasing the temperature of the hot gases passing through said stratum;

(g) cooling said stratum at the conclusion of said indurating step with cooler spent gases that have traversed said stratum to preheat said gases for recycle through said stratum;

(h) coating at least a portion of said indurated pellets with moistened iron ore blend to increase the average diameter of said pellets to a predetermined diameter larger than said predetermined small diameter;

(i) supporting a stratum of said moist blend coated indurated pellets on said grate;

(j) reindurating said moist blend coated indurated pellets by passing hot gases through said stratum to form discrete metallized layered pellets in which from about 60% to about 95% of the available iron in said layered pellets is reduced to the metal;

(k) separating from the reindurated pellets a portion having said larger predetermined diameter; and (l) recycling the relatively smaller pellets having an average diameter less than said predetermined larger diameter to said coating operation.

6. A process for producing metallized layered iron ore pellets having a predetermined larger diameter and in which from about 60% to about 95% of the available iron in said ore is reduced to the metal, comprising the steps of:

(a) forming a blend of iron ore including a solid carbonaceous material in an amount at least sufficient to reduce the iron content to free metal;

(b) moistening said blend;

(c) forming moist pellets of said moistened and blended iron ore having a predetermined average small diameter;

(d) forming a hearth stratum of previously produced metallized iron ore pellets in which from about 60% to about 95% of the available iron in said pellets is reduced to the metal;

(e) supporting a stratum of said moist pellets on said hearth stratum;

(f) indurating said moist pellets by passing hot gases through said stratum to form discrete metallized pellets in which from about 60% to about 95% of the available iron in said pellets is reduced to the metal;

(g) coating at least a portion of said indurated pellets with moistened iron ore blend to increase the average diameter of said pellets to a predetermined diameter larger than said predetermined small diameter;

(h) supporting a stratum of said moist blend coated indurated pellets on said hearth stratum;

(i) reindurating said moist blend coated indurated pellets by passing hot gases through said stratum to form discrete metallized layered pellets in which from about 60% to about 95% of the available iron in said layered pellets is reduced to the metal;

(j) separating from the indurated pellets a portion having said larger predetermined diameter; and (k) recycling the relatively smaller pellets having an average diameter less than said predetermined larger diameter to said coating operation.

7. A process for producing metallized layered iron ore pellets having a predetermined large diameter and in which from about 60% to about 95% of the available iron in said ore is reduced to the metal, comprising the steps of:

(a) forming a blend of iron ore including a solid carbonaceous material in an amount at least sufficient to reduce the iron content to free metal;

(b) moistening said blend;

(c) forming moist pellets of said moistened and blended iron ore having a predetermined average small diameter;

(d) forming a hearth stratum of previously produced metallized iron ore pellets in which from about 60% to about 95% of the available iron in said pellets is reduced to the metal;

(e) supporting a stratum of said moist pellets on said hearth stratum;

(f) indurating said moist pellets by passing hot gases through said stratum to form discrete metallized pellets in which from about 60% to about 95% of the available iron in said pellets is reduced to the metal;

(g) coating at least a portion of said indurated pellets with moistened iron ore blend to increase the average diameter of said pellets to a predetermined diameter larger than said predetermined small diameter;

(h) supporting a stratum of said moist blend coated indurated pellets on said grate;

(i) reindurating said moist blend coated indurated pellets by passing hot gases through said stratum to form discrete metallized layered pellets in which from about 60% to about 95% of the available iron in said layered pellets is reduced to the metal;

(j) separating from the reindurated pellets a portion having said larger predetermined diameter;

(k) recycling the relatively smaller pellets having an average diameter less than said predetermined larger diameter to said coating operation;

(l) supporting a stratum of said moist blend recoated reindurated pellets on said grate;

(m) again reindurating said moist blend recoated reindurated pellets by passing hot gases through said stratum to form discrete metallized multilayered pellets in which from about 60% to about 95% of the available iron in said multilayered pellets is reduced to the metal;

(n) separating from the indurated pellets at the conclusion of the reinduration steps a portion having an average relatively larger predetermined diameter;

(o) separating from said indurated pellets at the conclusion of the reinduration steps a portion having an intermediate average predetermined diameter;

(p) separating from said indurated pellets at the conclusion of the reinduration steps a portion having an average relatively small average predetermined diameter;

(q) recycling the portion having an intermediate average predetermined diameter to said moist blend coating operation;

(r) dividing said portion having an average relatively small predetermined diameter into two parts;

(s) recycling one of said parts from step (r) to said moist blend coating operation; and (t) recycling one of said parts to said hearth stratum forming operation.

References Cited
UNITED STATES PATENTS

| | | | |
|---|---|---|---|
| 2,750,273 | 6/1956 | Lellep | 75—3 |
| 2,792,298 | 5/1957 | Freeman | 75—3 |
| 3,134,667 | 5/1964 | Halowaty et al. | 75—5 |

BENJAMIN HENKIN, *Primary Examiner.*